(12) United States Patent
Rommer

(10) Patent No.: US 9,251,415 B2
(45) Date of Patent: Feb. 2, 2016

(54) METHOD AND APPARATUS FOR IDENTIFYING SYMBOL BEARING GAMING BALLS

(75) Inventor: Christian Rommer, Gumpoldskirchen (AT)

(73) Assignee: NOVOMATIC AG, Gumpoldskirchen (AT)

( * ) Notice: Subject to any disclaimer, the term of this patent is extended or adjusted under 35 U.S.C. 154(b) by 249 days.

(21) Appl. No.: 13/980,487

(22) PCT Filed: Jan. 23, 2012

(86) PCT No.: PCT/IB2012/050309
§ 371 (c)(1),
(2), (4) Date: Oct. 8, 2013

(87) PCT Pub. No.: WO2012/098535
PCT Pub. Date: Jul. 26, 2012

(65) Prior Publication Data
US 2014/0029795 A1    Jan. 30, 2014

(30) Foreign Application Priority Data
Jan. 21, 2011    (EP) .................................... 11450010

(51) Int. Cl.
*G06K 9/00* (2006.01)
*A63F 7/04* (2006.01)
*G07C 15/00* (2006.01)
*G06K 9/32* (2006.01)

(52) U.S. Cl.
CPC .......... *G06K 9/00536* (2013.01); *G06K 9/3258* (2013.01); *G07C 15/001* (2013.01); *G06K 2209/03* (2013.01)

(58) Field of Classification Search
CPC combination set(s) only.
See application file for complete search history.

(56) References Cited

U.S. PATENT DOCUMENTS

| 6,080,061 A | 6/2000 | Watanabe et al. |
| 7,775,521 B1 * | 8/2010 | Itkis et al. ................. 273/144 B |

(Continued)

FOREIGN PATENT DOCUMENTS

| DE | 20005276 | 8/2000 |
| EP | 0828234 | 3/1998 |

(Continued)

OTHER PUBLICATIONS

International Search Report for PCT/IB2012/050309, English translation attached to original, Both completed by the European Patent Office on Apr. 5, 2012, All together 10 Pages.

(Continued)

*Primary Examiner* — Tahmina Ansari
(74) *Attorney, Agent, or Firm* — Brooks Kushman P.C.

(57) ABSTRACT

A method for identifying a selected playing ball from a prescribed number of playing balls, wherein each of the playing balls is provided with a different symbol, wherein: a) the selected playing ball is moved from a starting position past an image recording unit pickup, b) the mass center of the depiction of the selected playing ball in the image is kept unaltered for a prescribed, c) the image position and size of the depiction of the playing ball is ascertained, and a check is performed to determine whether portions of the depiction of the playing ball are situated outside a lateral of the image, and d) if portions of the depiction of the playing ball are situated outside said lateral edge, the playing ball is returned to the pickup area of the image recording unit and/or is repositioned and steps b) to d) are repeated.

18 Claims, 10 Drawing Sheets

(56) References Cited

U.S. PATENT DOCUMENTS

| | | |
|---|---|---|
| 2004/0256800 A1 | 12/2004 | Campo et al. |
| 2006/0105833 A1 | 5/2006 | Lin |
| 2006/0196488 A1 | 9/2006 | Morshed et al. |
| 2011/0250944 A1* | 10/2011 | Skvortsov ..................... 463/17 |

FOREIGN PATENT DOCUMENTS

| | | |
|---|---|---|
| ES | 2163377 | 1/2002 |
| FR | 2577429 | 8/1986 |
| JP | 8280902 | 10/1996 |
| JP | 2008246237 | 10/2008 |

OTHER PUBLICATIONS

Website http://web.archive.org/web/20071206135612/http://www.neurallabs.net/en/Rec.-Bolas-bingo-4.html Dated Dec. 6, 2007, 2 Pages, "The systems that work read license plates with Neural Labs technology."

Neural Labs May 2007, 13 Pages, "BBAR v.2.0.00 Bingo Balls Automatic Reader DLL Function Reference."

Neural Labs Feb. 2007, 4 Pages, "BBAR v.1.2.00 Bingo Balls Automatic Reader Technical Manual."

Cheriet et al. Wiley Character Recognition Systems 2007, 52 Pages, "A Guide for Students and Practitioners."

Huang et al. IEEE Youth Conference on Information, Computing and Telecommunication Sep. 20, 2009, p. 510-513, "Number Ball Recognition at Arbitrary Pose Using Multiple View Instances."

* cited by examiner

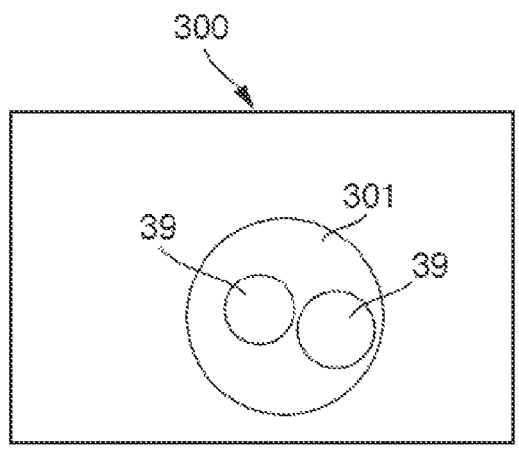
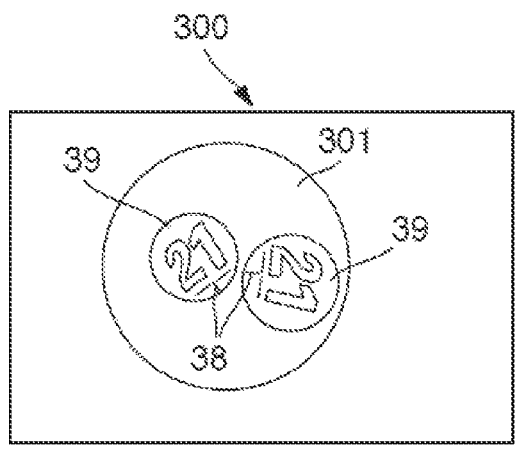
Fig. 13                    Fig. 14
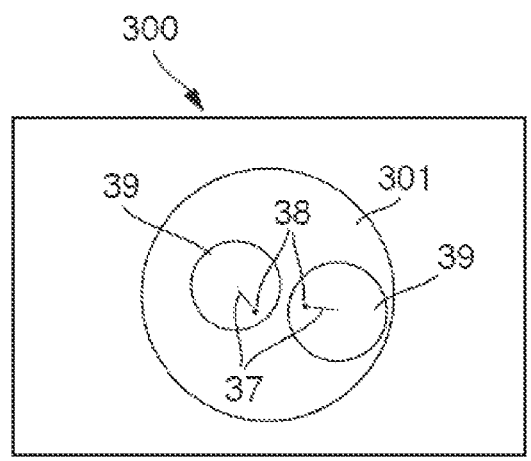
Fig. 15

METHOD AND APPARATUS FOR IDENTIFYING SYMBOL BEARING GAMING BALLS

CROSS-REFERENCE TO RELATED APPLICATION

This application is the U.S. national phase of PCT Application No. PCT/IB2012/050309 filed on Jan. 23, 2012, which claims priority to EP Patent Application No. 11450010.1 filed on Jan. 21, 2011, the disclosures of which are incorporated in their entirety by reference herein.

The invention relates to a method according to the preamble of patent claim 1. The invention also relates to an apparatus according to the preamble of patent claim 9.

FIELD OF THE INVENTION

Methods and apparatuses according to the invention are preferably used in the area of the automated playing of games of chance. In particular, such methods and apparatuses may be used for the playing of an automated bingo game.

BACKGROUND OF THE INVENTION

The background of the invention is the automated detection of playing balls after they have been selected or drawn from a prescribed number of playing balls. To allow them to be played, typical games with playing balls to be drawn, such as for example lotto, bingo, etc., require an automatic gaming machine, by which an objective generation of random numbers is ensured. For the player, the randomness of the result of the game should be clearly evident, in particular the player should be given the feeling that the drawing is carried out without any manipulations to his or her detriment. For this reason, gaming machines which, in addition to the automated drawing of playing balls, also perform an automated identification of the playing balls, are used in the prior art.

The prior art discloses many different procedures in which the playing balls are provided with transponder chips and the identification is performed by way of RFID. Other systems use barcodes for identifying the playing balls. Yet other systems use cameras and special algorithms in order to identify the symbols printed or stamped on the playing balls.

What is problematic about all these methods is that the positioning of the balls for being recorded by the camera must take place very precisely, in order to achieve a clear identification of the symbols depicted on the balls.

The invention therefore addresses the problem of improving the identification or an identification of the balls and providing a method and an apparatus with which the detection of the balls is improved and is less susceptible to errors.

The invention solves the problem in the case of a method of the type mentioned at the beginning by the features of the characterizing part of patent claim 1.

The invention solves this problem in the case of an apparatus of the type mentioned at the beginning by the features of the characterizing part of patent claim 9.

SUMMARY OF THE INVENTION

In the case of a method for identifying a selected playing ball, it is provided according to the invention that, from a prescribed number of playing balls, each of the playing balls being respectively provided with symbols that differ from the other playing balls, a) the selected playing ball is moved from a starting position through the recording area of an image recording unit, b) the center of mass of the depiction of the selected playing ball in the image of the image recording device is kept unchanged for a prescribed period of time and does not undergo a relative movement in relation to the image, c) the image position and the size of the depiction of the playing ball are ascertained, and a check is performed to determine whether parts of the depiction of the playing ball are situated outside a lateral edge prescribed beforehand in relation to the image, and d) if parts of the depiction of the playing ball are situated outside this lateral edge, the playing ball is returned to the recording area of the image recording unit and/or is repositioned and steps b) to d) are repeated, and e) at least one image recorded by the image recording unit is taken as a basis for carrying out a method of identification and ascertaining an identification result that corresponds to or is clearly assigned to the symbol on the surface of the selected playing ball.

Here there is the advantage that the recognition or identification of the selected playing ball can be carried out much more reliably and false detections that are brought about on the basis of incorrect positioning of the selected playing ball can be avoided. The repetition according to the invention allows the playing ball to be repositioned and re-evaluated.

Furthermore, it may be provided that, to establish the center of mass of the depiction of the selected playing ball in the image of the image recording unit, the playing ball is stopped and remains unmoved in relation to the image recording unit.

Such an approach makes a mechanically simple construction of the gaming machine possible and additionally reduces the susceptibility to errors.

A further particular aspect of the invention provides that the playing ball is moved by means of a ball guiding unit from the starting position along a prescribed path through the recording area of the image recording unit, the respective selected playing ball being removed from the ball guiding unit after it has moved over the prescribed path, and passed on if appropriate.

This makes a simple structural design of the image recording device possible and allows the horizontal installation of an image recording device, whereby it is possible to dispense with a more complicated ventilation system that is specifically designed for vertically arranged image recording devices.

Alternatively or in addition, it may be provided that the selected playing ball is advanced on the prescribed path in the form of an arc of a circle on a horizontal plane, the recording direction or the line of sight of the image recording unit running substantially horizontally and preferably being directed to a point on the prescribed path at which the playing ball is closest to the image recording unit.

This brings about particularly simple recording by the image recording device and reduces the susceptibility to errors of the method.

Furthermore, it may be provided that the playing ball is received by a circular clearance of the ball guiding unit, which is of a substantially flat and disk-shaped form, and is secured against laterally rolling away.

It may in this respect be provided that the playing ball is thrown or falls into or onto the circular clearance from above, and the fall of the playing ball preferably being slowed down, in particular by an elastic damping unit located underneath the clearance.

This prevents the playing balls from being destroyed and prolongs the lifetime of the gaming machine and the playing balls.

One particular aspect of the invention provides that the playing ball is guided and/or rotated in the clearance of the ball guiding unit and is supported on a base plate located underneath the disk-shaped ball guiding unit. This makes a mechanically simple construction possible and brings about the effect that the playing ball rotates as it runs along the prescribed path, and consequently the probability of error-free detection of the symbols increases, since the playing ball can be seen from different directions.

More preferably, it may be provided that, at the end of the path, the playing ball falls through a clearance located in the base plate and is transported further. This makes it possible for the playing ball to be easily transported away after identification has taken place.

Furthermore, it may be provided that the image recording unit produces images continually at prescribed time intervals. This makes a multiplicity of different, mutually independent identification operations possible and increases the accuracy or certainty of detection.

In particular, it may be provided that these images are preferably displayed visibly for the players on a monitor. This provides the player with a better overview of the game and suggests to the player the impression of a game that is free from manipulation and is fair.

A development of the invention provides that, during a prescribed period of time, a number of images, in particular four, are produced and the identification of the playing ball is performed on the basis of at least two images recorded at different points in time, the identification for each of the images being performed separately and each identification of an image producing a separate identification result, an identification only being deemed to have been performed correctly if a prescribed number, in particular at least half, preferably all, of the identification results are identical. This allows the reliability of the identification to be increased further.

To improve the accuracy of identification, it may be provided that an identification result is ascertained on the basis of a recorded image, symbols arranged in circles being respectively arranged on the playing balls, and a marking line representing the direction of the script being provided, arranged in particular underneath in the direction of the script and representing as it were an underlining of the respective symbol, the marking line being joined in particular to the circle, in particular by way of a secondary line, in that regions of the depiction of the playing ball that are bounded by a circular line, in particular a solid circular line, are sought and stored as recognition regions, the alignment of symbols located within the region is established for all the encircled regions that are found, in particular in that the depiction of a marking line adjacent the circular line or joined to it is sought and the alignment thereof is established, that the image regions found are rotated in accordance with their alignment, so that the ascertained symbols are in each case aligned the same, c) if appropriate, the image regions are scaled to a prescribed size, and d) the script symbols located in the aligned and/or rotated regions are in particular first filtered and then subjected to a symbol recognition process and an identification result representing the respective symbol is ascertained for each of the aligned regions, the identification result that has been found for most regions being considered as the ascertained result in the possible event of different identification results for a number of regions. The invention also relates to an apparatus for identifying a playing ball selected from a prescribed number of playing balls, each of the playing balls being respectively provided with a symbol that differs from the other playing balls, a) with an image recording unit, which has a recording area,
b) with means for moving the selected playing ball from a starting position through the recording area of an image recording unit,
c) with a checking unit for checking the position and the size of the depiction of the playing ball, and for issuing a positioning signal in the event that parts of the depiction of the playing ball are situated outside a lateral edge prescribed beforehand in relation to the image,
d) a positioning unit, which is arranged downstream of the checking unit and, when there is a positioning signal at its input, activates the means for moving the selected playing ball to a new position and/or for repositioning the playing ball, and
e) an identification unit for identifying symbols located on the playing balls on the basis of at least one image recorded by the image recording unit, at the output of which there is an identification result that corresponds to or can be clearly assigned to a symbol on the surface of the selected playing ball.

In the case of such an apparatus, the recognition or identification of the selected playing ball is significantly more reliable. False detections that are brought about on the basis of incorrect positioning of the selected playing ball can be effectively and reliably avoided. The repetition according to the invention allows the playing ball to be repositioned and re-evaluated.

A control unit which, to establish the center of mass of the depiction of the selected playing ball in the image of the image recording unit, stops or deactivates the means for moving the playing ball, so that the playing ball remains unmoved in relation to the image recording unit, may also be provided.

This allows a particularly simple and mechanically stable construction, with at the same time a low susceptibility to errors.

For the playing ball to be easily transported away after identification has taken place, a ball guiding unit may be provided, with which the playing ball can be moved from the starting position along a prescribed path through the recording area of the image recording unit, the respective selected playing ball falling out of the ball guiding unit after it has moved over the prescribed path.

A development of the invention that is mechanically particularly advantageous provides that the ball guiding unit is formed as a flat, in particular transparent, thin plate, in particular as a circular disk, which for receiving the playing ball has at least one eccentrically arranged, in particular circular clearance, the plate of the ball guiding unit being arranged horizontally and being mounted rotatably and/or pivotably about a pivoting point, in particular the center of the circular disk, and the recording direction or the line of sight of the image recording unit running substantially horizontally and preferably being directed to a point on the prescribed path at which the playing ball is closest to the image recording unit.

It may also be provided that an inlet that lies directly above a point on the prescribed path is provided, an elastic damping unit for slowing down a playing ball being provided in particular directly underneath the inlet. This prevents the playing balls from being destroyed and prolongs the lifetime of the gaming machine and the playing balls.

One particular aspect of the invention provides that a base plate for supporting and guiding the playing balls is provided underneath the disk-shaped ball guiding unit. This makes a mechanically simple construction possible and brings about the effect that the playing ball rotates as it runs along the prescribed path, and consequently the probability of error-free detection of the symbols increases, since the playing ball can be seen from different directions.

More preferably, it may be provided that a clearance of the size of a playing ball is provided at the end of the path, in particular in the base plate, so that a playing ball can fall through this clearance. This makes it possible for the playing ball to be easily transported away after identification has taken place.

A monitor which displays images recorded by the image recording unit continually at prescribed time intervals may also be provided. This makes a multiplicity of different, mutually independent identification operations possible and increases the accuracy or certainty of detection. The player is provided with a better overview of the game and the impression of a game that is free from manipulation and is fair is suggested to the player.

For improved visibility and for increasing the quality of the recording of the balls by the image recording device, it may be provided that the clearance is continued up to the edge of the ball guiding unit and, in at least one position of the path, a hemisphere of the playing ball is completely displayed by the image recording unit and in particular is not concealed by the ball guiding unit.

The invention is explained below on the basis of a preferred exemplary embodiment, represented in the following figures, without restricting the general inventive concept.

Figure 3:
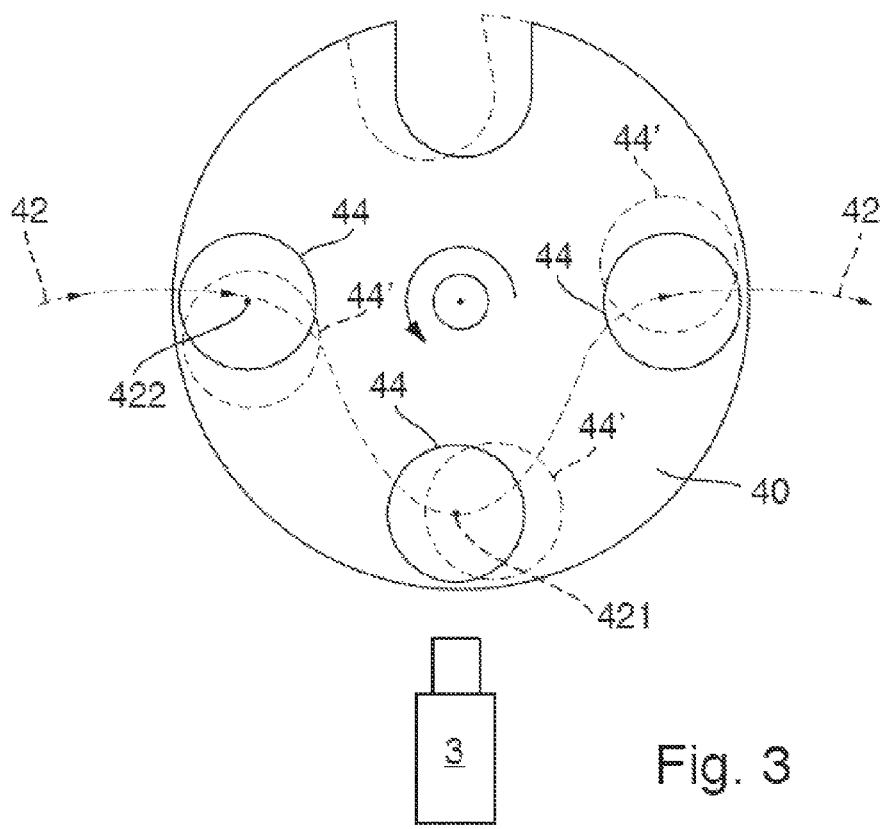

The construction and the operating mode of the carousel is schematically represented in FIG. 3.

Figure 4:
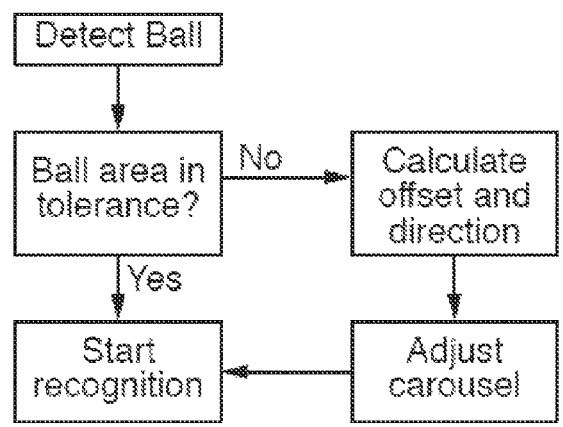

The method for adjusting the carousel 74 is represented in FIG. 4.

Figure 5A:
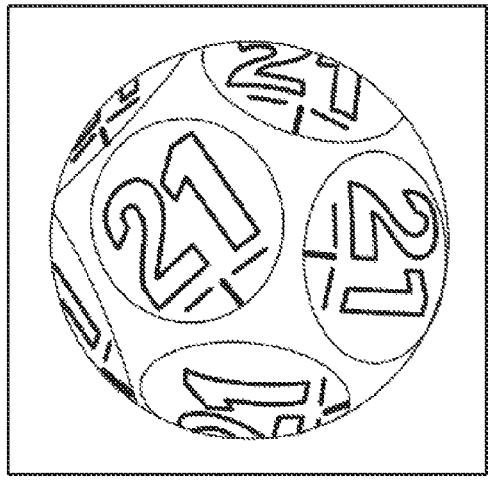
Figure 5B:
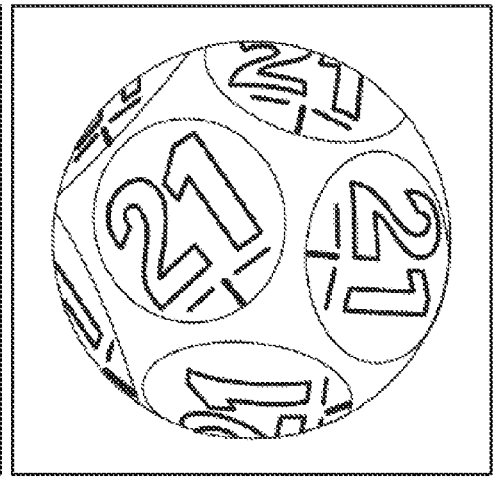

A typical playing ball is represented in color and in black and white in FIGS. 5a and 5b, respectively.

Figure 6:
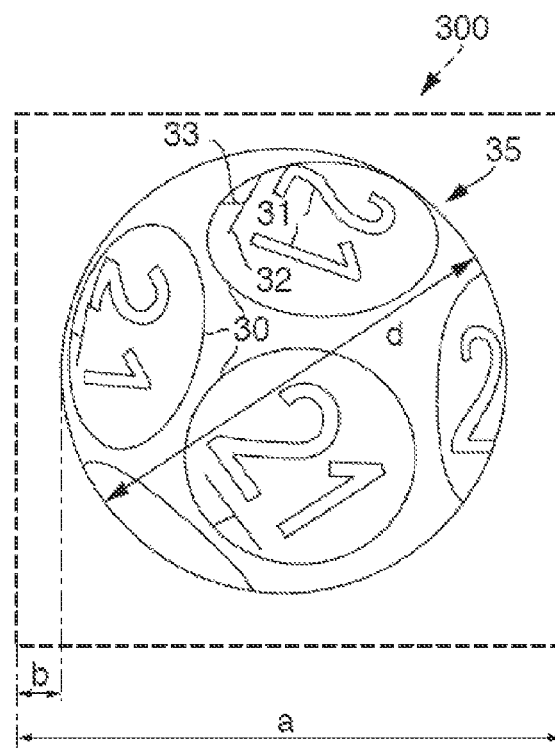

FIG. 6 shows the ascertainment of the position of the playing ball in the image.

Figure 7:
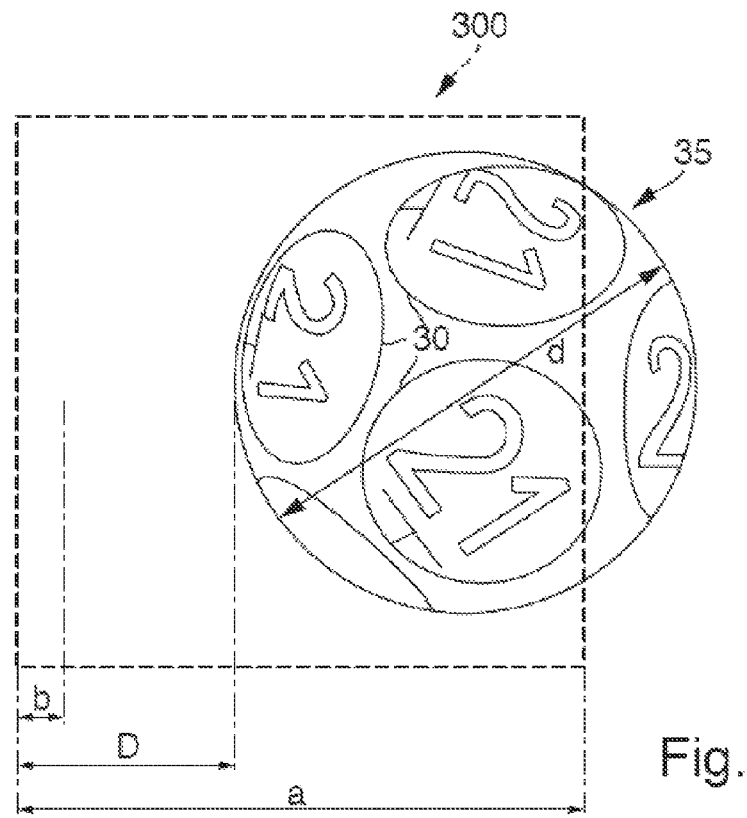

FIG. 7 shows an incorrectly positioned playing ball.

Figure 8:
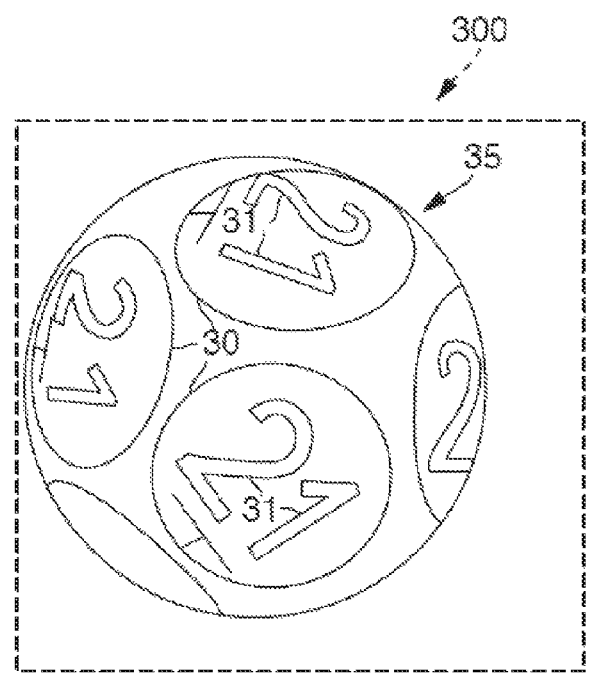

FIG. 8 shows a correctly positioned playing ball.

Figures 9, 10:
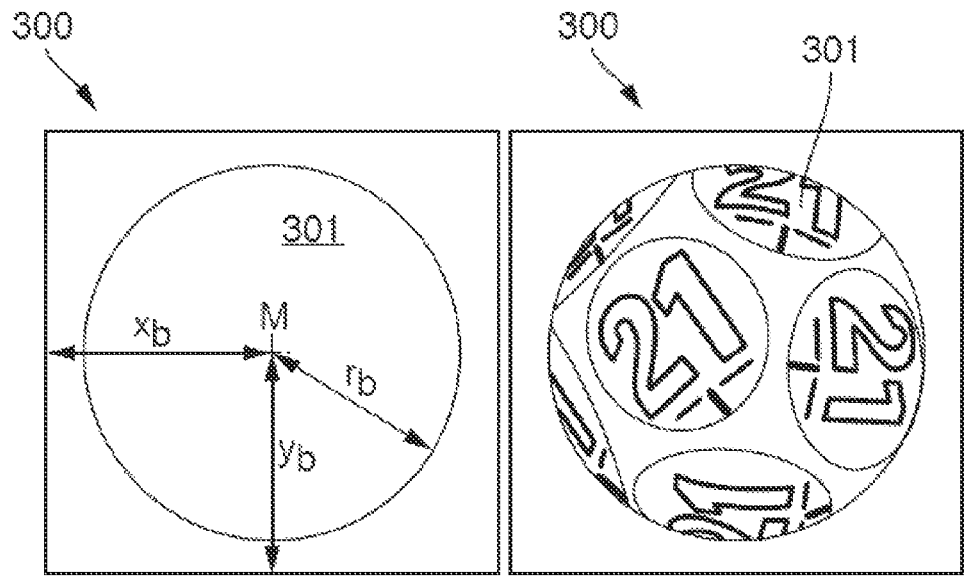

FIG. 9 shows the circle ascertained on the basis of the detection of the ball.

FIG. 10 shows that region of the image produced by the image recording unit that is characterized by the center-point coordinates and the radius.

Figures 11, 12:
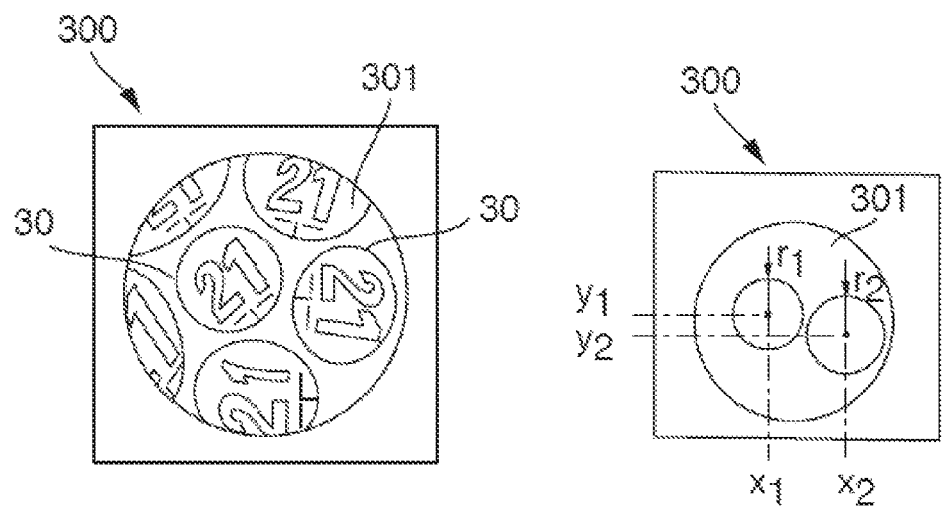

The result of rectification is represented in FIG. 11.

FIG. 12 shows the position of the ascertained circles on the respective balls.

FIG. 13 shows the masks for the ascertained circles.

FIG. 14 shows the image regions located in the masks or in the circles.

FIG. 15 shows the alignment of the symbols in the respective image regions.

Figure 16:
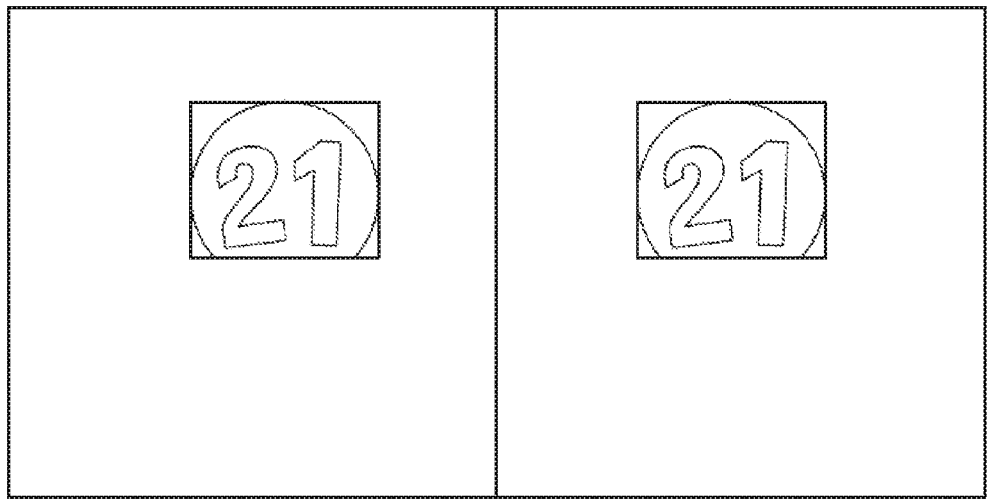
Figure 16A:

FIG. 16 shows the normalized, i.e. rotated and scaled, image regions with the symbols. FIG. 16a shows the image regions represented in FIG. 16 after a threshold operation.

Figure 17:
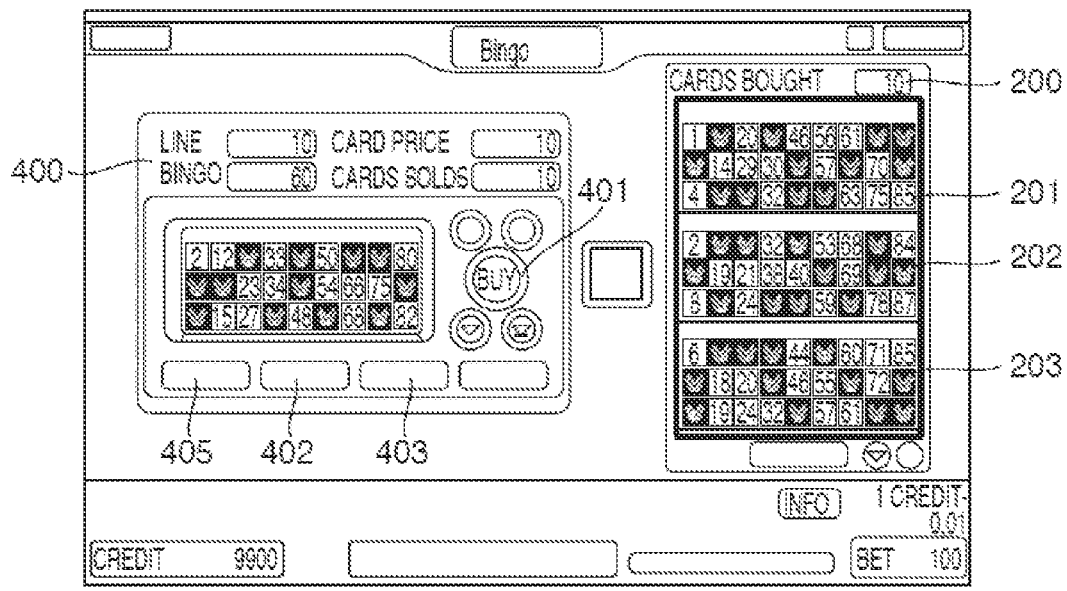

FIG. 17 shows the display content of a terminal for a player during the phase of placing bets.

Figure 18:
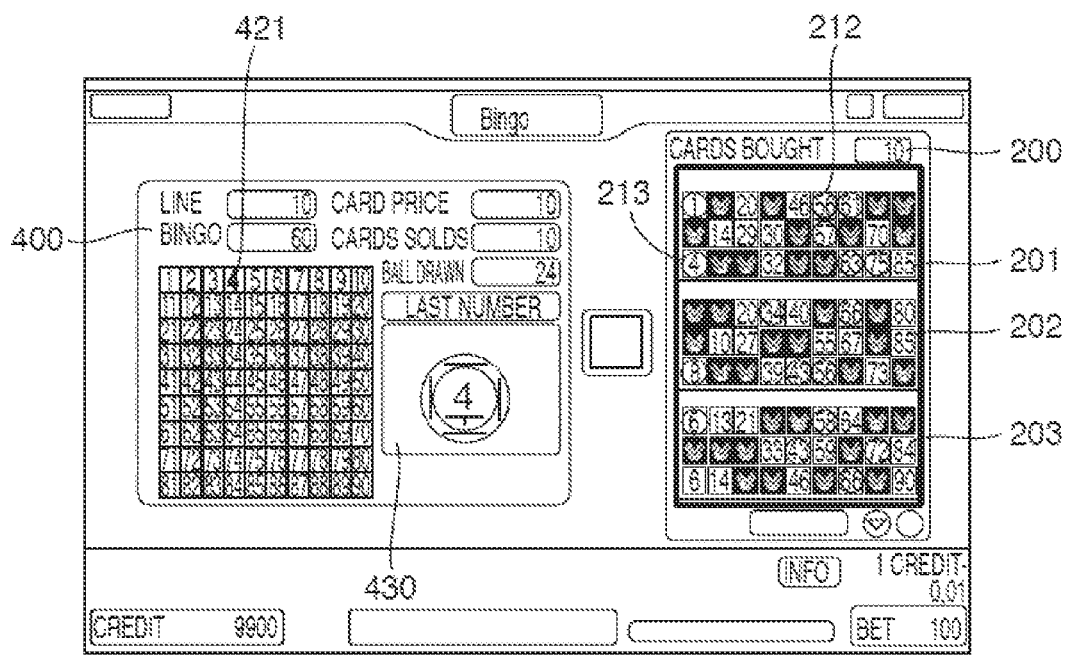

FIG. 18 shows the display content of the terminal during the draw.

Figure 19:
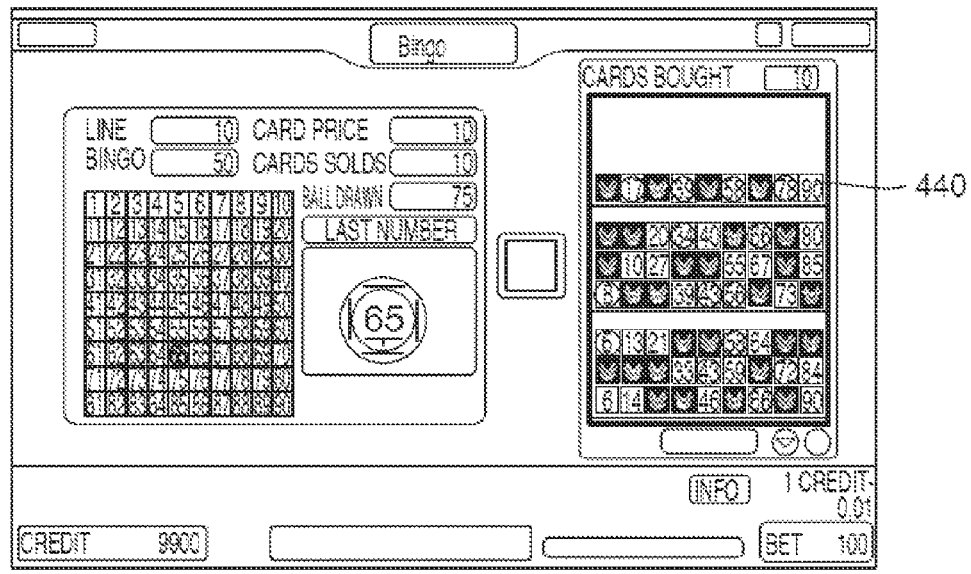

FIG. 19 shows the display content of the terminal in the case of a win.

Figure 20:
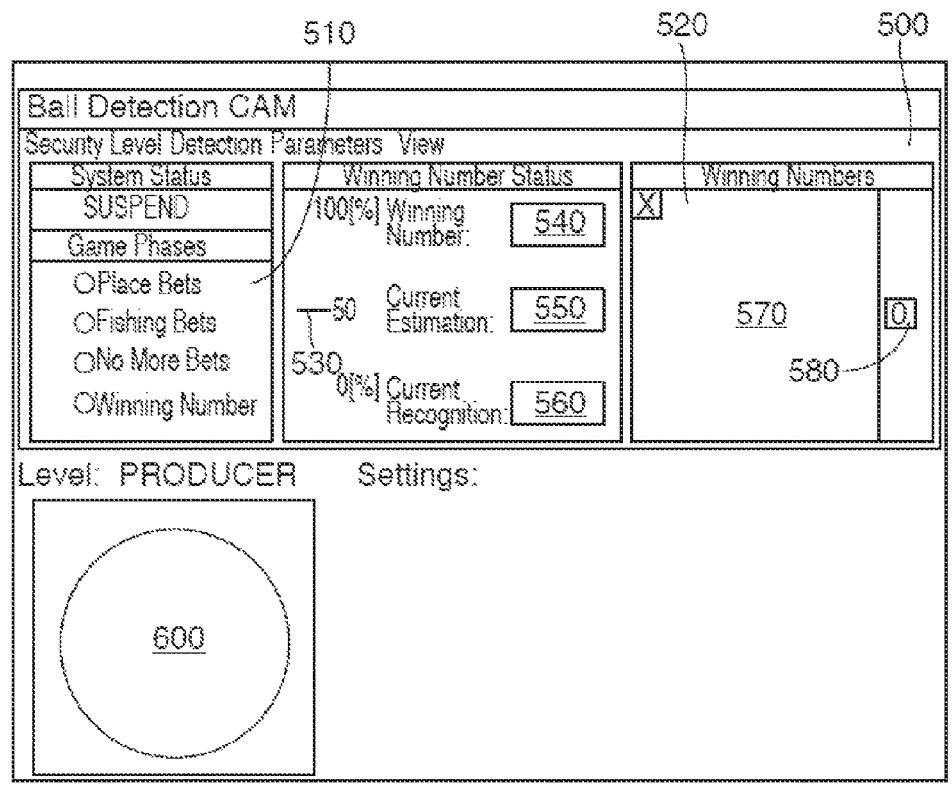

FIG. 20 shows the user interface for the game operator.

DESCRIPTION OF A PREFERRED EMBODIMENT OF THE INVENTION

Figure 1:
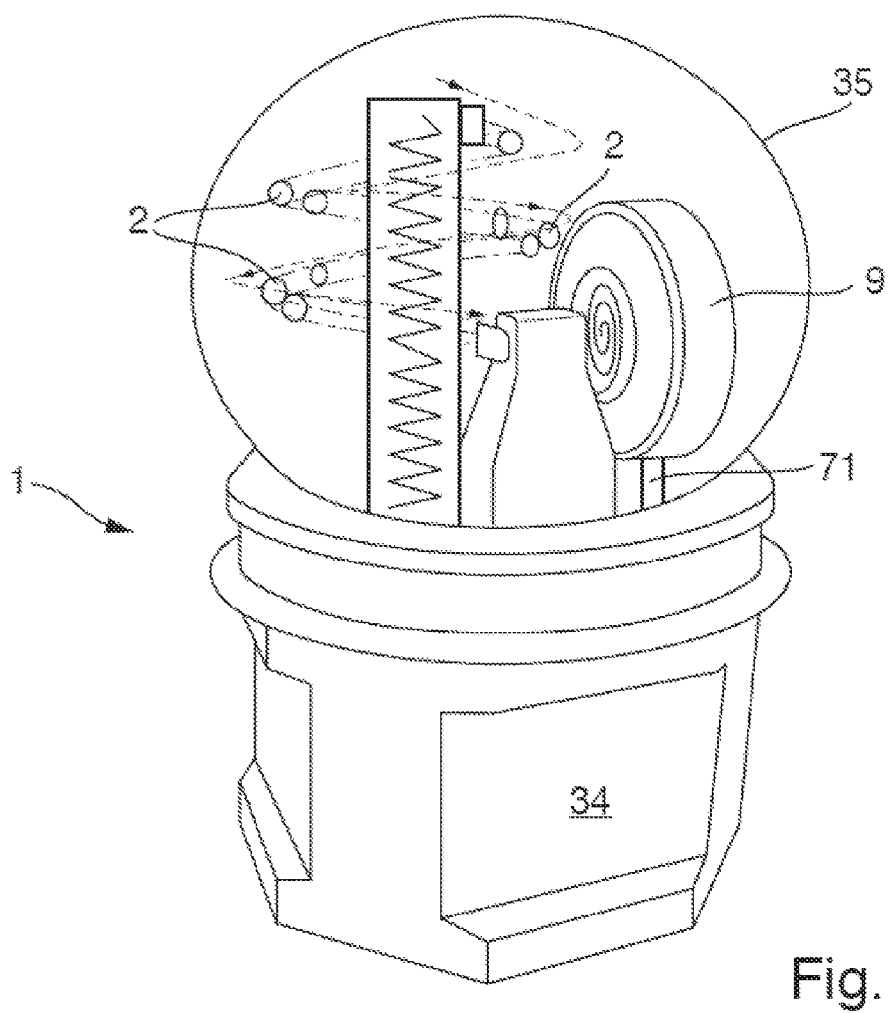
FIG. 1 shows an automatic ball drawing machine 1.

FIG. 1 shows an automatic ball drawing machine 1 for drawing balls 2 for a bingo game. The present case concerns an automatic unit 1 with a base 34 and an automatic ball drawing machine 1 mounted on the base 34. Arranged around the automatic ball drawing machine 1 is a spherical glass enclosure as a covering 350, which prevents a player from having direct access to the automatic ball drawing machine 1. In the present case, the glass enclosure is formed as transparent. This has the advantage in particular that the automatic ball drawing machine 1 with the automatic unit can be set up or arranged centrally in rooms and that individual players can take up positions around the automatic unit 1. Alternatively, the glass enclosure 350 may also be formed as at least partially opaque or non-transparent, advantageously with an unobstructed view of the main parts of the automatic gaming machine.

In the present case, this covering 350 is formed as spherical, but, on the basis of its main purpose, that of protecting the automatic ball drawing machine 1 from access by players, any other desired form may be chosen, for instance also a cylindrical form or a conical form, as long as access by individual players to the automatic ball drawing machine 1 is prevented.

Figure 2:
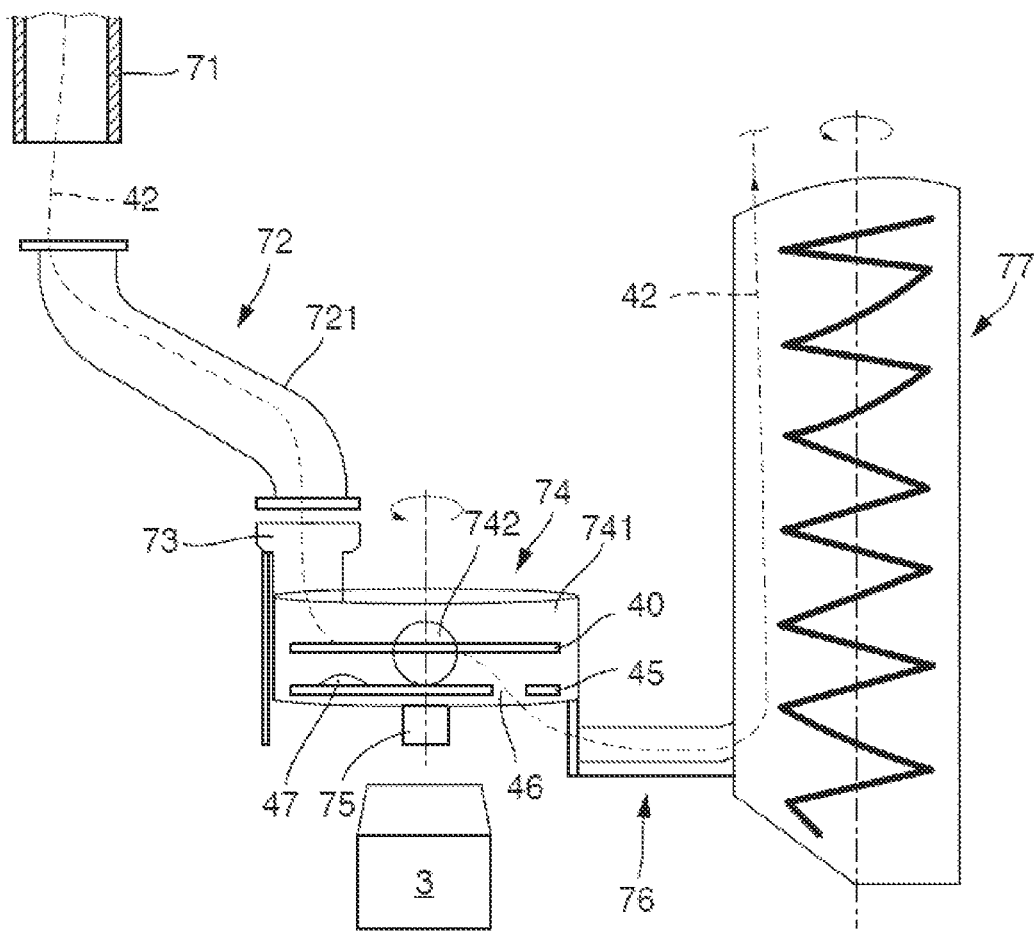
FIG. 2 schematically shows an advantageous refinement of an apparatus according to the invention for identifying the playing balls 2 in detail.

FIG. 2 schematically shows an advantageous refinement of an apparatus according to the invention for identifying the playing balls 2. After the drawing in the drawing drum 9, the selected playing ball 2 passes via the downpipe 71 into a ball guide 72. The ball guide 72 comprises a body with a number of arranged rods 721, within which the playing ball 2 is guided. The rods 721 define a path 42, along which a playing ball 2 falling through the downpipe 71 is advanced further. At the end of the ball guide 72, the playing ball 2 passes into an inlet 73 in the form of a throw basket 73. The playing ball 2 is slowed down in its horizontal movement in the throw basket 73 and falls through the throw basket 73 perpendicularly downward into the region of a carousel 74.

The construction and the operating mode of the carousel is schematically represented in FIG. 3. The carousel 74 comprises a ball guiding unit 4 in the form of a thin circular plate 40, represented in FIG. 3. The plate 40 is mounted rotatably or pivotably about an axis running perpendicularly to the plane of the plate and through the circular center of the plate 40. In the present example, the rotation takes place counterclockwise, when viewed from above. The plate 40 or the ball guiding unit 4 has four circular clearances 44, which are arranged along the circumference and are somewhat larger than the diameter of the respective playing ball 2. In the course of the rotation, the clearances 44 move along in the circumferential direction of the circular plate 40 and are represented in an offset position by dashed lines with the reference numeral 44'.

Directly underneath the rotatably or pivotably mounted plate 40 of the ball guiding unit 4 there is a base plate 45. In the region directly underneath the throw basket 73 or the inlet 73 there is on the base plate 45 an elastic damping unit 47, which slows down the playing ball 2 falling through the throw basket 73 and ensures that the respective playing ball 2 is not damaged. In one particular embodiment of the invention, it is provided that the elastic damping unit 47 is embodied by a rubber band or rubber buffer, which is arranged on the base plate 45 directly underneath the throw basket 73. The rubber band is in this case arranged in such a way that, when it lands directly on it, no part of the playing ball 2 touches the base plate 45. Once the fall of the playing ball 2 has been slowed down and it is resting in the clearance 44 of the plate 40 and is supported by the base plate 45, the plate 40 is rotated and the playing ball 2 located in the clearance 44 rotates and/or is advanced along a prescribed circular path 42. As represented in FIG. 2, the carousel 74 has a lateral encasing 741, which has a clearance 742. The image recording unit 3 is directed horizontally at the clearance 742. Consequently, playing balls 2 that are located inside the carousel 74 can be recorded by the image recording unit 3 located outside the carousel 74. If the plate 40 of the carousel 74 rotates counterclockwise, the selected playing ball 2 passes on its prescribed path 42 through the carousel 74 through the recording area of the image recording unit 3, and is recorded by the latter.

The carousel 74 is driven by a motor 75, in the present case by a stepping motor 75, which is located underneath the base plate 45 and is connected to the base plate 45.

Alternatively, it may also be provided that the clearance 44 is continued up to the edge of the plate or of the ball guiding unit 4, as represented in FIG. 3 in the alternative clearance 441. Such an alternative clearance 441 has the considerable advantage that the playing ball 2 is not concealed or covered during its recording by the image recording unit 3. In this alternative embodiment, it may be provided that the playing ball 2 is guided by the lateral casing 741 of the carousel 74 or else by a transparent covering located in the region of the clearance 742 of the casing 741, so that the position of the playing ball 2 on the path 42 is established.

The edge of the clearance 441 of the plate 40 of the ball guiding unit 4 or of the carousel 74 does not even partially conceal the selected playing ball 2, so that an improved evaluation is possible. The representation of different clearances 44, 441 merely serves to illustrate possible different types of guidance of the playing ball 2 in the carousel 74. Usually, the plate of the carousel 74 always comprises clearances 44, 441 of the same form. Provided in the base plate 45 at the end of the prescribed path 42 is a clearance 46, through which the playing ball 2 can fall downward. In this exemplary embodiment, this clearance 46 is formed as circular. This clearance 46 is adjoined by a further ball guide 76, which passes on the playing ball 2 to a lifting device 77.

The lifting device 77 returns the playing ball 2, by way of a further ball guide 2 that is not represented, to the draw. If appropriate, the drawn playing balls 2 may be temporarily stored until the conclusion of the respective game and only returned to the drawing after the conclusion of the game, in order to prevent the repeated drawing of a playing ball 2 during the same game.

A typical playing ball 2 is represented in FIGS. 5a, 5b. The playing ball 2 bears multiply printed on its surface a symbol 21, which is located within a circle 22. Located underneath the symbol 21 in the direction of the script is a marking line 23, which is joined to the circle 22 by means of a secondary line 24, which extends downward in the direction of the script.

While the playing ball 2 is in the recording area of the image recording unit 3, the image recording unit 3 continually produces recordings of the playing ball 2. In an advantageous refinement of the invention, the playing ball 2 is stopped on its path in a position 421 in the recording area of the image recording unit 3. Alternatively, it may also be provided that the image recording unit 3 is mounted pivotably by a further motor and the playing ball 2 is tracked, the center of mass M of the depiction of the playing ball 2 in the image being kept constant. For this purpose, arranged upstream of the further motor (not represented in the figure) is a control unit, which is arranged downstream of the image recording unit 3 and activates the further motor in such a way that the depiction of the playing ball is completely in the recording area of the image recording unit 3.

The images recorded by the image recording unit 3 are additionally displayed on a monitor, not represented, facing the players.

A recording of a playing ball 2 is schematically represented in FIGS. 5a, 5b. The image 300 produced by the image recording unit 3 is represented in FIG. 6 and shows a depiction 35 of the playing ball 2. Furthermore, a depiction 31 of the respective symbol 21, a depiction 32 of the marking line 23 and a depiction 33 of the respective secondary line 24 as well as a depiction 30 of the circle 22 are represented.

First, the image position of the depiction 35 of the playing ball 2 in the image 300 produced by the image recording unit 3, represented in FIG. 6, is ascertained. The diameter d of the depiction 35 of the playing ball 2 and the lateral distance b of the depiction 35 of the playing ball 2 from the left-hand edge of the image are ascertained—in each case in pixels. On the basis of the image width a of the image established by the image recording unit 3, an optimum lateral distance b—given in pixels—can be calculated. It follows that: $b=(a-d)/2$. If the position of the playing ball 2 deviates from the optimum position, the left-hand edge of the depiction 35 of the playing ball 2 is at a position D deviating from b. Such a situation is represented in FIGS. 7 and 8. The deviation of the position D from the optimum left-hand side edge can be determined, the difference being compared with a threshold value T. If the difference exceeds the threshold value, if in particular the depiction 35 of the playing ball 2 is partially outside the image, as represented in FIG. 8, the playing ball 2 is repositioned.

In particular, the playing ball 2 may for this purpose be reset on the path 42 into a starting position 422 (FIG. 3) and the entire movement of the playing ball 2 through the recording area of the image processing unit 3 repeated. However, with the use of a more precisely positionable motor 75, for instance stepping motors, it is also possible to adjust the incorrectly positioned playing ball 2 on the basis of the calculated position 0 along or counter to the direction of advancement of the path and to keep repeating the ascertainment of the position of the playing ball 0 until the playing ball 2 is entirely located in the recording area of the image processing unit 3 and the depiction 35 of the playing ball 2 is completely contained in the image produced by the image recording unit 3. The method for adjusting the carousel 74 is represented in FIG. 4.

Once the playing ball 2 has been completely recorded by the image recording unit 3, a method of identification is started, ascertaining the symbol 21 depicted on the playing ball 2 on the basis of the image produced by the image recording unit 3. In this particular exemplary embodiment, the image recording unit 3 produces color images (FIG. 5a), which however are converted into grayscale images (FIG. 5b) before further processing.

In a first step, the image position and the size of the circle are ascertained by means of a detection process and stored in the form of the center-point coordinates $x_b$, $y_b$ and the diameter or the radius $r_b$. The circle produced in FIG. 9 with the ascertained coordinates and the ascertained radius is made available for further processing. FIG. 10 shows that region 301 of the image 300 produced by the image recording unit 3 that is characterized by the center-point coordinates $x_b$, $y_b$ and the radius $r_b$.

In a further step, the distortion that is brought about by the spherical surface of the playing balls 2 is eliminated by a rectification. Methods of rectifying symbols printed on the surface of a sphere are generally known to a person skilled in the art from the prior art. If appropriate, a calibration may take place, by means of which circular regions located on the playing ball 2 are depicted simply on circular regions of the rectified image. The result of the rectification is represented in FIG. 11, only very minor residual errors or residual distortions remaining. The rectifying operation also comprises a scaling of the image, so that the rectified image has the same size as the original image.

Furthermore, as represented in FIG. 12, those positions in which the depictions 30 of the circles 22 printed on the playing balls 2 are located are detected. Circles are detected, for instance by means of a Hough transformation, both the center points (x1, y1), (x2, y2) and the radii r1, r2 of the respective depictions 30 of the circles 22 printed on the playing balls 2 being available after carrying out this recognition step.

As represented in FIG. 13, the image regions or masks located in the detected circles are masked, the respectively associated masks 39 being represented in FIG. 13. FIG. 14 shows the image regions of the rectified image that are masked by the masks 39.

A marking point 38, which is obtained as the point of intersection of the respective depictions 31, 32 of the marking line 23 and the secondary line 24 of the respective playing ball 2, is ascertained for each of the marked image regions or for each of the masks 39. FIG. 15 shows the two detected masks 39, a joining line 37 between the respective center point of the mask and the respective marking point 38 being represented on each of the masks 39. The joining line 37 is at an angle to the x axis and/or to the y axis of the recorded image. In the next step, the individual masked circular image regions or masks 39 are rotated in such a way that the joining lines 37 are aligned parallel to the y axis. FIG. 16 shows a depiction of the two masked image regions, each of the image regions—as already mentioned—having previously been correspondingly rotated, so that the symbols 21 or the depiction 31 thereof are aligned straight in relation to the coordinates of the image. Furthermore, the masked image regions are scaled to a prescribed size.

Subsequently, the masked image regions are subjected to a threshold operation, the individual brightness values of the respective pixels being compared with a threshold value and the pixel being set to the value "black" or "zero" if the threshold value is not reached and being set to "white" or "one" if the threshold value is exceeded. FIG. 16a shows the result of the application of a threshold operation to the respective marked image regions. The marked image regions are passed on to a symbol recognition process. Quite generally, any desired known symbol recognition algorithm (OCR) may be used for this. The prior art discloses many OCR methods that can equally be used within the scope of the invention. An identification result that corresponds to the symbol 21 is ascertained, an assignment between the symbols and a corresponding identification result being prescribed in advance. An identification result is respectively obtained for each mask 39.

If appropriate, the image recognition process may be carried out with many different images ascertained or produced by the image recording unit 3 one after the other in time. The aforementioned method of identification is carried out separately for each of the images, and an identification result is respectively obtained for each individual mask 39.

Ideally, identical identification results are obtained. However, in the case of only poorly visible, partially concealed or greatly distorted image regions, the problem may arise that a clear identification of the respective symbol is not possible. In this case, it is provided that an identification is only deemed to have been performed correctly if more than half of the identification results are identical.

In FIGS. 17 to 19, different user interfaces for players are represented; in FIG. 20, a user interface for the operator of an automatic machine is represented. In the present exemplary embodiment, each player is respectively assigned a terminal or a computer that is connected—for instance via the Internet—to the server of the game operator. Each player has a screen, on which the situation of the game is represented in a graphically appealing manner. The player has a pointer, for instance a mouse or a touchscreen, by means of which he or she can select a position on the screen and actuate an input button that is displayed.

FIG. 17 shows the content displayed on the screen before the beginning of a game. At this point in time, the bingo cards can be purchased. On the right-hand side 200, the purchased bingo cards 201, 202, 203 are represented. On the left-hand side 400, different bingo cards can be selected before purchase. With the purchase button, individual bingo cards can be chosen. By selecting multiple purchase buttons, five or ten bingo cards can also be purchased simultaneously. By actuating the abort button 405, the purchase can be aborted, and the game begins.

FIG. 18 shows the content displayed on the screen while the game is in progress. Among other things, a number of numbers have already been marked on the bingo cards 201, 202, 203 represented on the right, i.e. playing balls 2 with the corresponding numbers have already been drawn and the numbers on the bingo card are marked by a circle 212. The last-drawn number is additionally displayed in bold and in color.

On the left-hand side 400, a number grid with the numbers from one to ninety is displayed, the last-drawn number 421 being in color or in bold and the already drawn numbers being lit up. Numbers that have not been drawn are displayed as gray. Furthermore, the last-drawn number is either displayed in a panel 430 as an animated ball or the image signal produced by the image recording unit 3 is displayed directly as a live video.

FIG. 19 shows the screen content when there is a win. An inscription 440 is superposed on the right-hand side.

FIG. 20 shows the screen content 500 for the operator of the automatic machine. In the subwindow "Game Phases" 510, the respective phase of the game, that is to say the purchasing phase for purchasing cards (FIG. 17), the conclusion of the purchasing phase, the actual playing phase (FIG. 18) and the win (FIG. 19), is displayed. The subwindow "Winning Number Status" 520 displays the current status of the identification of the playing balls 2. A threshold value of 50% is fixed, represented by a bar 530. If a winning number of five identifications is drawn three times, this number is established as the winning number. In the panel "Winning Number" 540, the ultimate winning number is displayed. In the panel "Current Estimation" 550, the currently expected winning number is displayed during the recognition process. In the panel "Current Estimation" 560, the currently recognized winning number is displayed during the recognition process. In the subwindow "Winning Numbers", on the one hand the already ascertained winning numbers are displayed in the panel 570, on the other hand a bar 580, which graphically shows the progress of the draw. In the panel 600, the image signal produced by the image recording unit 3 is displayed directly as a live video.

The invention claimed is:

1. A method of identifying a selected gaming ball from a predefined number of gaming balls, each of the gaming balls being provided with a symbol, which is different from the symbols of the other gaming balls, the method comprising:
- a) acquiring an image of a selected gaming ball moving from a starting position through an acquisition area of an image recording unit,
- b) determining from the acquired image the center of mass of the selected gaming ball and maintaining the center of mass unaltered in the acquired image in the image recording unit for a predefined period of time and limiting relative movement of the center of mass with respect to the image,
- c) determining the position and size of the image of the gaming ball and verifying whether parts of the image of the gaming ball are located outside a lateral edge predefined with respect to the image, and,
- d) if parts of the image of the gaming ball are outside of this lateral edge, the gaming ball is shifted based on the calculated position along or opposite the progressing direction of the path of the gaming ball and brought back to the acquisition area of the image recording unit and repositioned, and steps b) to d) are repeated, and
- e) based on at least one image recorded with the image recording unit, identifying the symbol which is unambiguously associated with the selected gaming ball.

2. The method in accordance with claim 1, wherein, fixing the center of mass of the selected gaming ball in the image of the image recording unit, the gaming ball is stopped and remains motionless with respect to the image recording unit.

3. The method in accordance with claim 1, wherein the gaming ball is moved from the starting position along a predefined path through the acquisition area of the image recording unit by a ball guiding unit, wherein the respective selected gaming aurin ball is removed from the ball guiding unit after moving on its predefined path and optionally forwarded.

4. The method in accordance with claim 3, wherein the selected gaming ball is moved forward on the predefined path in the form of a circular arc on a horizontal plane, wherein the recording direction or line of sight of the image recording unit is essentially horizontal and directed to a spot on the predefined path in which the gaming ball is closest to the image recording unit.

5. The method in accordance with claim 3, wherein the gaming ball is received by a circular recess of the ball guiding unit, which is essentially designed to be flat and discoid, and is secured against rolling away laterally, wherein
- a) the gaming ball is tossed into and/or falls onto the circular recess from above and wherein the fall of the gaming ball is decelerated, in particular by an elastic damping unit disposed below the recess, and/or
- b) the gaming ball is guided and/or rotated in the recess of the ball guiding unit and supported on a base plate located beneath the discoid ball guiding unit and/or
- c) the gaming ball falls through a recess located in the base plate and/or located beneath the ball guiding unit and is transported further.

6. The method in accordance with claim 1, wherein image recording unit permanently produces images in predefined time intervals and that these images are shown on a monitor so to be visible for the players.

7. The method in accordance with claim 1, wherein, during the predefined period, a number of, in particular four, images is produced and identification of the gaming ball takes place based on at least two of images recorded at different time points, wherein identification is done separately for each of the images and wherein each identification of an image delivers a separate identification result.

8. A method of identifying a selected gaming ball from a predefined number of gaming balls, each of the gaming balls being provided with a symbol, which is different from the symbols of the other gaming balls, the method comprising:
- a) acquiring an image of a selected gaming ball moving from a starting position through an acquisition area of an image recording unit,
- b) determining from the acquired image the center of mass of the selected gaming ball and maintaining the center of mass unaltered in the acquired image in the image recording unit for a predefined period of time and limiting relative movement of the center of mass with respect to the image,
- c) determining the position and size of the image of the gaming ball and verifying whether parts of the image of the gaming ball are located outside a lateral edge predefined with respect to the image, and,
- d) if parts of the image of the gaming ball are outside of this lateral edge, the gaming ball is shifted based on the calculated position along or opposite the progressing direction of the path of the gaming ball and brought back to the acquisition area of the image recording unit and repositioned, and steps b) to d) are repeated, and
- e) based on at least one image recorded with the image recording unit, identifying the symbol which is unambiguously associated with the selected gaming ball, wherein an identification result is determined based on a recorded image, wherein symbols of writing are used as symbols and wherein symbols of writing arranged in circles are arranged on the gaming balls, and wherein a marking line representing the direction of writing is provided, which is, in particular, arranged below in writing direction and equally represents an underline under the respective symbol of writing, wherein the marking line is, in particular, connected to the circle, in particular via an auxiliary line, by
- finding areas of the image of the gaming ball and saving them as recognition areas, which are limited by an, in particular solid, circular line,
- for all areas limited by circular edges that were found, determining the orientation of the symbol located within the area, rotating the found image areas according to their orientation so that the determined symbols are each uniformly orientated, and
- first filtering the symbols of writing located in the oriented and/or rotated areas and then subjecting them to a symbol recognition procedure and, for each of the oriented areas, determining an identification result representing the respective symbol.

9. The method in accordance with claim 8, wherein for all areas limited by circular edges that were found, the orientation of the symbol located within the area is determined by finding the image of a marking line abutting, or connected to, the circular line and determining its orientation.

10. The method in accordance with claim 8, wherein the image areas are scaled to a predefined dimension after being oriented.

11. The method in accordance with claim 8, wherein, in the case of differing identification results for multiple areas, that identification result is considered to be determined which has been recognized for the majority of areas.

12. A device for identifying a selected gaming ball from a predefined number of gaming balls, each of the gaming balls being provided with a symbol, which is different from the symbols of the other gaming balls,
- a) comprising an image recording unit, which has an acquisition area, b) comprising means of moving the selected gaming ball from a starting position through the acquisition area of the image recording unit,
c) comprising an examining unit for examining the position and size of the image of the gaming ball as well as for producing a positioning signal in case parts of the image of the gaming ball are located outside a lateral edge predefined with respect to the image, and,
d) a positioning unit downstream of the examining unit, which causes the means for moving the selected gaming ball to reposition the gaming ball a new position and/or to reposition the gaming ball in its entrance if a positioning signal is present, wherein the device is configured to shift the gaming ball based on the calculated position along or against the progressing direction of the path of the gaming ball, and
e) an identifying unit for identifying symbols located on the gaming balls based on at least one image recorded by means of the image recording unit, at the output of which there is an identification result that corresponds to, or is unambiguously associated with, the symbol on the surface of the selected gaming ball.

13. The device in accordance with claim 12, wherein a control unit, which, in order to fix the center of mass of the image of the selected gaming ball in the image of the image recording unit, stops or inactivates the means for moving the gaming ball so that the gaming ball remains motionless with respect to the image recording unit.

14. The device in accordance with claim 12, wherein a ball guiding unit is provided, by which the gaming ball can be moved from the starting position along a predefined path through the acquisition area of the image recording unit, wherein the respective selected gaming ball falls out of the ball guiding unit after being moved via the predefined path.

15. The device in accordance with claim 14, wherein the ball guiding unit is designed to be a flat, in particular transparent, thin disc, in particular a circular disc, which has at least one eccentrically arranged, in particular circular, recess for receiving the gaming ball, wherein the disc of the ball guiding unit is arranged horizontally and rotatably and/or pivotably supported around a center of gravity; and wherein the recording direction or line of sight of the image recording unit is essentially horizontal and directed to a spot on the predefined path in which the gaming ball is closest to the image recording unit.

16. The device in accordance with claim 15, wherein
a) an inlet is provided, which is located immediately above a spot on the predefined path, wherein an elastic damping unit for decelerating a gaming ball is provided in particular immediately beneath the inlet and/or
b) a base plate for supporting and guiding the gaming balls is provided beneath the discoid ball guiding unit, and/or
c) a recess having the size of a gaming ball is provided at the end of the path, in particular in the base plate, so that a gaming ball can fall through said recess.

17. The device in accordance with claim 15, wherein the recess of the ball guiding unit is continued until the edge of the ball guiding unit and that a hemisphere of the gaming ball is depicted in its entirety by the image recording unit and in particular not obscured by the ball guiding unit in at least one position on the path.

18. The device in accordance with claim 12, characterized by a monitor which shows images permanently recorded by the image recording unit in predefined time intervals.

\* \* \* \* \*

UNITED STATES PATENT AND TRADEMARK OFFICE
CERTIFICATE OF CORRECTION

| | | |
|---|---|---|
| PATENT NO. | : 9,251,415 B2 | Page 1 of 1 |
| APPLICATION NO. | : 13/980487 | |
| DATED | : February 2, 2016 | |
| INVENTOR(S) | : Christian Rommer | |

It is certified that error appears in the above-identified patent and that said Letters Patent is hereby corrected as shown below:

In the claims,

Column 11, Lines 33-34, Claim 3:

After "respective selected gaming"
Delete "aurin".

Column 12, Lines 44-45, Claim 8:

After "symbols are each uniformly"
Delete "orientated" and
Insert -- oriented --.

Column 13, Line 11, Claim 12:

After "reposition the gaming ball"
Insert -- to --.

Signed and Sealed this
Nineteenth Day of April, 2016

Michelle K. Lee
*Director of the United States Patent and Trademark Office*